United States Patent
Trigui et al.

(10) Patent No.: US 10,908,263 B1
(45) Date of Patent: Feb. 2, 2021

(54) SYSTEM AND METHOD FOR ALIGNING A LASER SCANNING DEVICE FOR MEASUREMENT OF A VOLUME OF A CONTAINER

(71) Applicant: Saudi Arabian Oil Company, Dhahran (SA)

(72) Inventors: Hassane Trigui, Thuwal (SA); Ali Outa, Gilching (DE); Sahejad Patel, Thuwal (SA); Fadl Abdellatif, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/716,381

(22) Filed: Dec. 16, 2019

(51) Int. Cl.
| | |
|---|---|
| *G05D 1/00* | (2006.01) |
| *G01N 29/265* | (2006.01) |
| *G01F 17/00* | (2006.01) |
| *G01S 17/89* | (2020.01) |
| *B64C 39/02* | (2006.01) |
| *G01S 7/481* | (2006.01) |
| *G01B 11/02* | (2006.01) |
| *G06K 7/10* | (2006.01) |

(52) U.S. Cl.
CPC ............ *G01S 7/4817* (2013.01); *G01B 11/02* (2013.01); *G06K 7/10821* (2013.01)

(58) Field of Classification Search
CPC .... G01S 7/4817; G01B 11/02; G06K 7/10821
USPC ........................................................ 348/135
See application file for complete search history.

(56) References Cited

U.S. PATENT DOCUMENTS

| | | | |
|---|---|---|---|
| 9,188,472 B2 | 11/2015 | Hassell, Jr. | |
| 10,338,592 B2 * | 7/2019 | Carrasco Zanini | ..... G01S 17/42 |
| 10,672,139 B2 * | 6/2020 | De Franchis | ...... G06K 9/00637 |
| 2014/0285375 A1 * | 9/2014 | Crain | ...................... G01S 13/90 342/25 A |
| 2017/0023394 A1 * | 1/2017 | Akbar | ................. G01F 23/0076 |
| 2019/0061922 A1 * | 2/2019 | Carrasco Zanini | ..... B64C 25/34 |

OTHER PUBLICATIONS

LS, John Stenmark. "Laser Scanning Aids in Tank Inspections." Point of Beginning RSS, Point of Beginning, Sep. 7, 2018,www.pobonline.com/articles/101455-laser-scanning-aids-in-tank-inspections.

(Continued)

*Primary Examiner* — Susan E. Hodges
(74) *Attorney, Agent, or Firm* — Leason Ellis LLP

(57) ABSTRACT

Systems and methods are provided for aligning a laser scanning device for measurement of a volume of a container. A method includes: causing an autonomous vehicle coupled to the laser scanning device to move to a location at a known distance from a reference circumference; generating data indicative of locations of points along a portion of the reference circumference; determining, based on the data, an alignment angle by which the autonomous vehicle is to steer such that an axis of the laser scanning device that intersects the container passes through a center axis of the container; causing the autonomous vehicle to steer by the alignment angle, such that the laser scanning device is thereby aligned normal to a tangent plane of a wall of the container; and measuring a plurality of horizontal offsets of the wall relative to the reference circumference for use in determining the volume.

20 Claims, 8 Drawing Sheets

(56) References Cited

OTHER PUBLICATIONS

Tim Lemmon, "Tank Inspection and Calibration with 3D laser screening", Trimble, Sunnyvale.
"Trimble RealWorks Advanced-Tank", Trimble, Sunnyvale.
Carl Thompson, "Storage Tank Inspection and Calibration Using Laser Scanning and Trimble RealWorks", 2014, Trimble, Sunnyvale.
Valk, Dirk. "Drones: Improving the Safety and Efficiency: Blog Applus+." Applus+ Blog, Mar. 19, 2019, blog.applus.com/drones-improving-the-safety-and-efficiency-of-industrial-inspections/.

* cited by examiner

US 10,908,263 B1

SYSTEM AND METHOD FOR ALIGNING A LASER SCANNING DEVICE FOR MEASUREMENT OF A VOLUME OF A CONTAINER

FIELD OF THE DISCLOSURE

The present disclosure relates to volume measurement of containers, and, more particularly, to alignment of a laser scanning device for measurement of a volume of a container.

BACKGROUND OF THE DISCLOSURE

In the oil and gas industry, the storage tanks for crude and refined products play a key part in the supply chain of hydrocarbons. Knowing the exact volume of these storage units plays a critical role when transferring products to and/or from the tanks. As a result of variations in external and internal conditions (e.g., temperature) and aging and also as a result of the weight of the liquid product (e.g., hydrostatic pressure), the tank volume can vary by as much as +/−0.2%. Considering a 250,000 barrel storage tank, this variation would result in a +/−500 barrel volume change.

As a result of the high value of petroleum hydrocarbons, there is a mandatory requirement for calibration of storage tanks. Tanks used for custody transfer must be calibrated such that the transferred volume is very accurately known (e.g., less than 0.1% error). The most commonly used techniques to perform this include manual strapping (API MPMS 2.2A), optical techniques (e.g., Optical Reference Line Method (ORLM)—API Chapter 2.2B, Optical Triangulation Method (OTM)—API Chapter 2.2C, Electro-Optical Distance Ranging Method (EODR)—API Chapter 2.2D), and liquid calibrations (API Standard 2555). However, there are concerns with the effectiveness of these measurements in meeting the desired accuracy levels. In some cases, the foregoing testing techniques require tank downtime (e.g., emptying of the tank or otherwise halting the tank operation temporarily), which accumulates additional costs to the losses incurred. Moreover, many of the foregoing testing techniques are invasive in that they require accessing the internal volume of the tank and also can be destructive.

The existing methods for tank calibration present significant drawbacks. For instance, using the current standards, it can take one to two days of work to perform the calibration. Some known optical techniques involve time-consuming placement and movement of laser devices as required to take all container measurements. Additionally, many known methods pose safety risks for the workers performing the calibration process.

As a result, calibration of storage tanks is performed infrequently, thus leading to inaccurate measurements of the actual volume stored within the tank or transferred to and from the tank, which can be costly. For example, a traditional timeframe between calibrations can be between five and fifteen years. Moreover, while laser-based techniques can allow more frequent calibration, these techniques are susceptible to errors that are introduced by inaccurate positioning of laser devices.

What is needed are systems and methods for measuring the volume of containers, such as storage tanks, that address the limitations associated with the efficiency of performing calibration using existing systems. More specifically, what is needed are systems and methods for accurately performing tank calibration that can be deployed and operated in a relatively quick, low-cost, and non-invasive manner. What is also needed is a system that can be deployed quickly and on-demand and thus facilitates highly accurate detection of changes in tank volume on a more frequent basis (e.g., on a daily basis or even per-fill basis). What is further needed are techniques that ensure proper positioning and alignment of devices used in container volume measurements, such as laser devices.

It is with respect to these and other considerations that the disclosure made herein is presented.

SUMMARY OF THE DISCLOSURE

According to an embodiment consistent with the present disclosure, a method for aligning a laser scanning device for measurement of a volume of a container is provided. The method includes: causing an autonomous vehicle coupled to the laser scanning device to move to a location at a known distance from a reference circumference of the container; generating, using the laser scanning device, data indicative of a plurality of locations of a respective plurality of points along a portion of the reference circumference of the container; determining, based on the data indicative of the plurality of locations of the respective plurality of points, an alignment angle by which the autonomous vehicle is to steer such that an axis of the laser scanning device that intersects the container passes through a center axis of the container; causing the autonomous vehicle to steer by the alignment angle while the autonomous vehicle is positioned at the location, such that the axis of the laser scanning device passes through the center axis of the container and the laser scanning device is thereby aligned normal to a tangent plane of a wall of the container; and measuring, using the laser scanning device while the laser scanning device is aligned normal to the tangent plane of the wall, a plurality of horizontal offsets of the wall relative to the reference circumference for use in determining the volume of the container.

In an embodiment, the location is a first location, the alignment angle is a first alignment angle, the tangent plane is a first tangent plane, the plurality of horizontal offsets is a first plurality of horizontal offsets, and the method further includes: causing the autonomous vehicle to move to a plurality of additional locations, the first location and the plurality of additional locations evenly circumferentially spaced from one another, each of the plurality of additional locations being at the known distance from the reference circumference of the container; causing, at each respective one of the plurality of additional locations, the autonomous vehicle to steer by a respective additional alignment angle such that the axis of the laser scanning device passes through the center axis of the container and the laser scanning device is thereby aligned normal to a respective additional tangent plane of the wall; measuring, at each respective one of the plurality of additional locations, using the laser scanning device while the laser scanning device is aligned normal to the respective additional tangent plane of the wall, a respective additional plurality of horizontal offsets of the wall relative to the reference circumference of the container; and determining the volume of the container based on a measurement of the reference circumference, the first plurality of horizontal offsets, and each respective additional plurality of horizontal offsets.

In an embodiment, the method further includes: determining, based on one or more dimensions of the container, a number of additional locations to be contained in the plurality of additional locations; determining, based on the determined number of additional locations, an angle by which the first location and the plurality of additional locations are to be evenly circumferentially spaced from one another; and determining the first location and the plurality of additional locations based on the determined number of additional locations and the determined angle.

In an embodiment, the method further includes: determining a thickness of the wall of the container; and determining a volume of structures within the container that are not usable for storage, wherein determining the volume of the container is further based on the thickness of the wall and the volume of the structures within the container that are not usable for storage.

In an embodiment, the method further includes measuring, using a temperature sensor or infrared camera, a temperature of an outer surface of the wall of the container, wherein determining the volume of the container is further based on the measured temperature.

In an embodiment, measuring the plurality of horizontal offsets comprises scanning the wall of the container vertically using a two-dimensional laser of the laser scanning device while the laser scanning device is aligned normal to the tangent plane of the wall.

In an embodiment, measuring the plurality of horizontal offsets comprises scanning the wall of the container vertically and horizontally within a predetermined angle using a three-dimensional laser of the laser scanning device while the laser scanning device is aligned normal to the tangent plane of the wall.

According to another embodiment consistent with the present disclosure, a system for aligning a laser scanning device for measurement of a volume of a container is provided. The system includes: the laser scanning device, the laser scanning device having an axis that intersects the container, the laser scanning device configured to scan a portion of a reference circumference of the container to generate data indicative of a plurality of locations of a respective plurality of points along the portion of the reference circumference; and an autonomous vehicle coupled to the laser scanning device, the autonomous vehicle configured to: move to a location at a known distance from the reference circumference to thereby allow the laser scanning device to scan the portion of the reference circumference; and steer by an alignment angle while being positioned at the location, the alignment angle being determined based on the data indicative of the plurality of locations of the respective plurality of points such that upon steering by the alignment angle, the axis of the laser scanning device passes through a center axis of the container to thereby align the laser scanning device normal to a tangent plane of a wall of the container, wherein the laser scanning device is further configured to scan the wall of the container, while the laser scanning device is aligned normal to the tangent plane of the wall, to measure a plurality of horizontal offsets of the wall relative to the reference circumference for use in determining the volume of the container.

In an embodiment, the location is a first location, the alignment angle is a first alignment angle, the tangent plane is a first tangent plane, the plurality of horizontal offsets is a first plurality of horizontal offsets, and the autonomous vehicle is further configured to: move to a plurality of additional locations, the first location and the plurality of additional locations evenly circumferentially spaced from one another, each of the plurality of additional locations being at the known distance from the reference circumference of the container; and steer, at each respective one of the plurality of additional locations, by a respective additional alignment angle such that the axis of the laser scanning device passes through the center axis of the container and the laser scanning device is thereby aligned normal to a respective additional tangent plane of the wall, wherein the laser scanning device is further configured to scan, at each respective one of the plurality of additional locations while the laser scanning device is aligned normal to the respective additional tangent plane of the wall, a respective additional plurality of horizontal offsets of the wall relative to the reference circumference for use in determining the volume of the container.

In an embodiment, the system further includes a computing device communicatively coupled to at least one of the autonomous vehicle and the laser scanning device, wherein the computing device is configured to determine the volume of the container based on a measurement of the reference circumference, the first plurality of horizontal offsets, and each respective additional plurality of horizontal offsets.

In an embodiment, the computing device is configured to determine the volume of the container further based on a thickness of the wall of the container and a volume of structures within the container that are not usable for storage.

In an embodiment, the laser scanning device includes a temperature sensor or an infrared camera, the temperature sensor or the infrared camera configured to measure a temperature of an outer surface of the wall of the container, wherein the computing device is configured to determine the volume of the container further based on the measured temperature.

In an embodiment, the autonomous vehicle is an unmanned ground vehicle (UGV) or an unmanned aerial vehicle (UAV).

In an embodiment, the location is a first location, the autonomous vehicle is the UAV, and the UAV is coupled, using at least one of a sensor and a laser diode, to an unmanned ground vehicle (UGV) positioned at a second location directly below the first location to thereby maintain the UAV at the first location.

In an embodiment, the laser scanning device comprises a LIDAR device.

In an embodiment, the LIDAR device comprises: a horizontal two-dimensional (2D) LIDAR scanning unit configured to scan the portion of the reference circumference to generate the data indicative of the plurality of locations of the respective plurality of points; and a vertical 2D LIDAR scanning unit configured to scan the wall of the container, while the LIDAR device is aligned normal to the tangent plane of the wall, to measure the plurality of horizontal offsets of the wall.

In an embodiment, the LIDAR device comprises a three-dimensional (3D) LIDAR scanning unit configured to: scan the portion of the reference circumference to generate the data indicative of the plurality of locations of the respective plurality of points; and scan the wall of the container within a predetermined angle, while the LIDAR device is aligned normal to the tangent plane of the wall, to measure the plurality of horizontal offsets of the wall.

According to another embodiment consistent with the present disclosure, a method for aligning a laser scanning device for measurement of a volume of a container is provided. The method includes: determining a plurality of locations that are evenly spaced circumferentially around the container; causing an autonomous vehicle coupled to the laser scanning device to move sequentially to each of the plurality of locations; scanning, using the laser scanning device at each respective one of the plurality of locations to which the autonomous vehicle moves, a respective portion of a reference circumference of the container to thereby identify a respective plurality of points on a wall of the container; determining, for each respective one of the plurality of locations to which the autonomous vehicle moves, based on the respective plurality of points on the wall of the container, an alignment angle by which the autonomous vehicle is to steer such that the laser scanning device is aligned normal to a tangent plane of the wall; and scanning, using the laser scanning device for each respective one of the plurality of locations to which the autonomous vehicle moves, while the laser scanning device is aligned normal to the tangent plane of the wall, a respective portion of the wall to determine a respective plurality of horizontal offsets of the wall relative to the reference circumference for use in determining the volume of the container.

In an embodiment, the method further includes determining the volume of the container based on a measurement of the reference circumference and based on each respective plurality of horizontal offsets of the wall.

In an embodiment, the method further includes: determining a thickness of the wall of the container; and determining a volume of structures within the container that are not usable for storage, wherein determining the volume of the container is further based on the thickness of the wall and the volume of the structures within the container that are not usable for storage.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

By way of overview and introduction, systems and methods are disclosed for measuring and determining the volume of containers, also referred to herein as "calibration." The container is, in various embodiments, a large petroleum storage tank. The systems and methods disclosed herein implement LIDAR ranging equipment to measure offsets in a similar manner as standard Optical Reference Line Method (ORLM) calibrations of storage tanks.

ORLM provides for the calibration of cylindrical tanks by measurement of one reference circumference, followed by determining the remaining circumferences at different elevation levels on the tank. The remaining circumferences are determined by measuring the horizontal offset of the tank wall from a vertical optical reference line. These circumferences are corrected, based on wall thickness, to calculate true internal circumferences, which can then be added to determine the tank volume.

More particularly, the systems and methods disclosed herein achieve alignment of an autonomous vehicle and a LIDAR device with a tank so that the LIDAR device is correctly positioned to perform the measurements mentioned above and described in further detail below.

Figure 1:
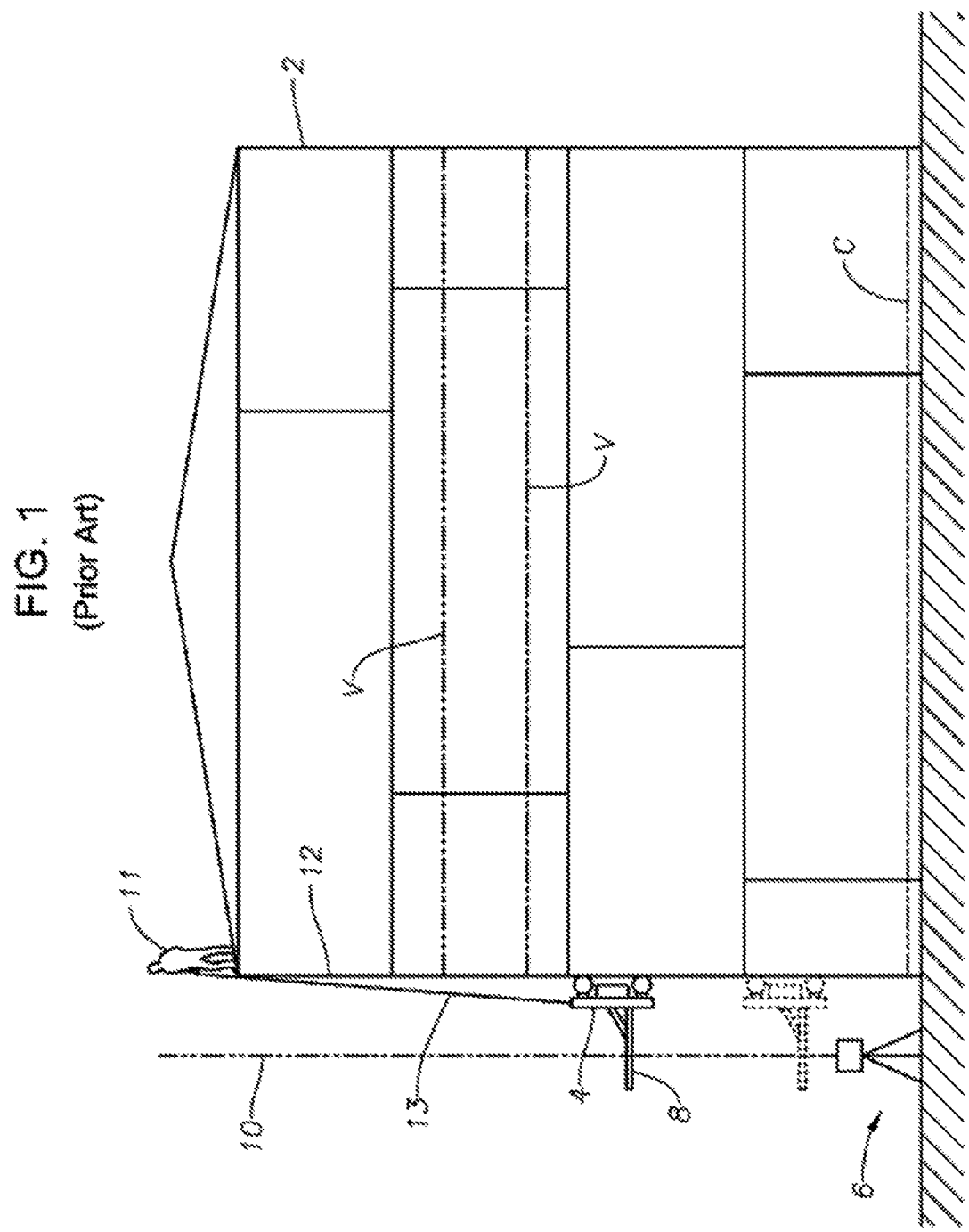
FIG. 1 is a schematic side view of a known system for carrying out the optical reference line method of tank calibration, according to an embodiment.

An example of the known ORLM method is shown in FIG. 1, in which there is shown a tank 2, a magnetic trolley 4, an optical device 6, and a horizontal graduated scale 8 attached to the trolley 4. The optical device 6 produces an optical ray of light 10 upwardly and parallel to the tank wall 12. The magnetic trolley 4 is typically controlled by an operator 11 positioned on top of the tank 2, that holds a rope 13 attached to the trolley 4. The operator 11 raises and lowers the trolley 4 on the tank wall 12 by manipulating the rope 13.

To measure the volume of the tank 2, a reference circumference C is first measured. The reference circumference is measured using a master tape (not shown), and is typically measured near the bottom of the tank 2. With the reference circumference known, the trolley 4 can be raised or lowered by the rope 13 to various vertical stations, or predetermined locations, along the tank wall 12. In most systems, the vertical stations are located between the weld seams on the tank. In FIG. 1, two of the vertical stations are indicated by lines V.

At each vertical station V, the horizontal offset between the tank wall 12 and the optical ray of light 10 is noted, using the horizontal graduated scale 8. Once a series of measurements have been taken at the vertical stations V, the measurements are repeated with the optical device 6 rotated 180 degrees to verify accuracy. Thereafter the measurements are used to determine the circumference of the tank at each vertical station (using the reference circumference as a reference point), and the volume of the tank can be estimated. Additional factors can also be considered when calculating volume, such as, for example, the temperature of the tank wall 12. This temperature is typically derived based on the temperature inside the tank and the ambient temperature.

Additionally, the ORLM measuring systems (e.g., optical device 6 and trolley 4 etc.) can be repositioned to additional circumferential stations around the circumference of the container and the process for measuring horizontal offset along the vertically oriented optical reference line can be repeated for each circumferential station. Accordingly, by increasing the number of circumferential stations at which the horizontal offset is measured, a more-detailed map of the container wall contour can be determined.

While the ORLM method shown in FIG. 1 is better in some ways than filling the tank and metering the fluid, as discussed above, it still has significant problems. For example, measuring the horizontal offset of the trolley 4 from the optical ray 10 at only a few select vertical stations V provides relatively few data points from which tank circumferences can be measured. Although this data can be extrapolated to estimate the volume of the tank, such extrapolations may not always be accurate. In addition, the method of FIG. 1 requires the operator 11 to be positioned on the top of the tank, which can be dangerous.

Furthermore, the use of an optical ray 10 and a horizontal graduated scale 8 to measure the horizontal offset of the tank wall 12 lacks the precision necessary to calculate accurate tank volumes. This is because an operator must read the horizontal graduated scale 8 at each horizontal offset, often from a distance. This approach also requires significant time in comparison to an automatic sensor system. Exemplary systems and methods for measuring the volume of a tank using a laser-based device instead of optical device 6 and similar ORLM measuring techniques are further described in commonly assigned U.S. Pat. No. 9,188,472, to Hassell, entitled "Enhanced reference line tank calibration method and apparatus," filed May 21, 2013, which is hereby incorporated by reference as if set forth herein in its entirety.

According to a salient aspect, the systems and method further described herein utilize the ORLM method but replace both the magnetic trolley and vertical laser source station with a single 3D laser ranging device positioned at a distance 'x' from the tank shell and autonomously aligned with the center axis of the tank. The laser scanner is mobilized around the tank using an autonomous ground vehicle or unmanned aerial vehicle (UAV). Similar to ORLM techniques, a reference circumference C is measured to extrapolate the circumference of the tank and the offset of the tank wall relative to the measured circumference C.

Figure 2A:
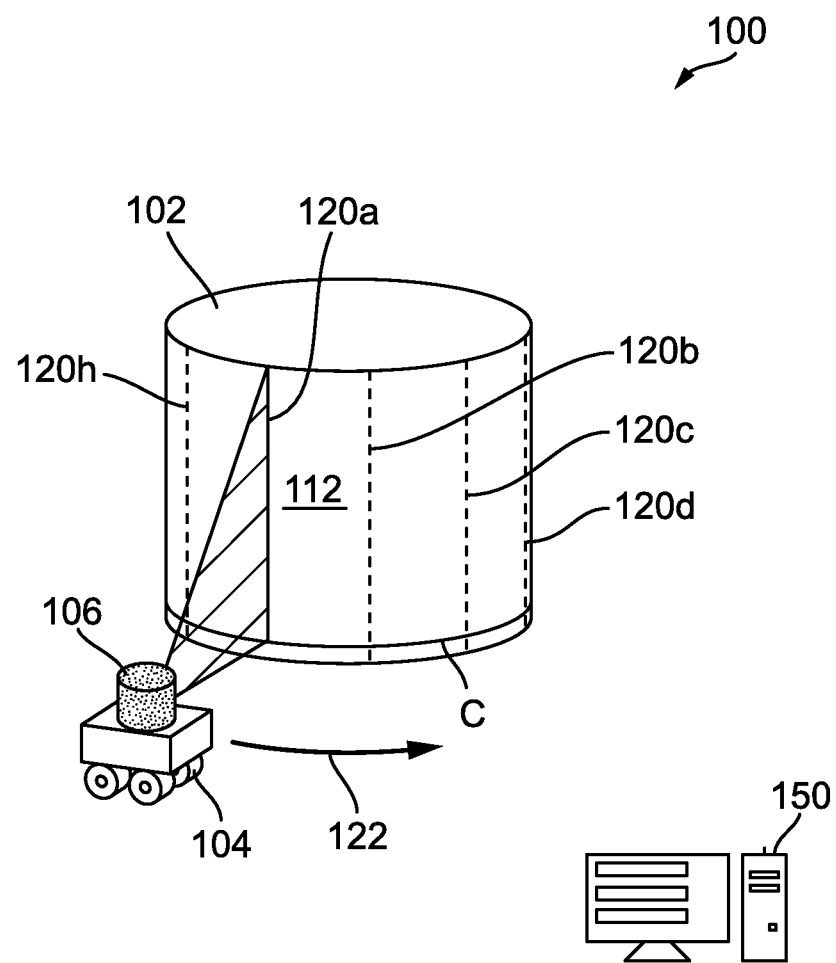
FIG. 2A is a conceptual perspective view representation of an exemplary LIDAR-based system for measuring the volume of a container, according an embodiment.
Figure 2B:
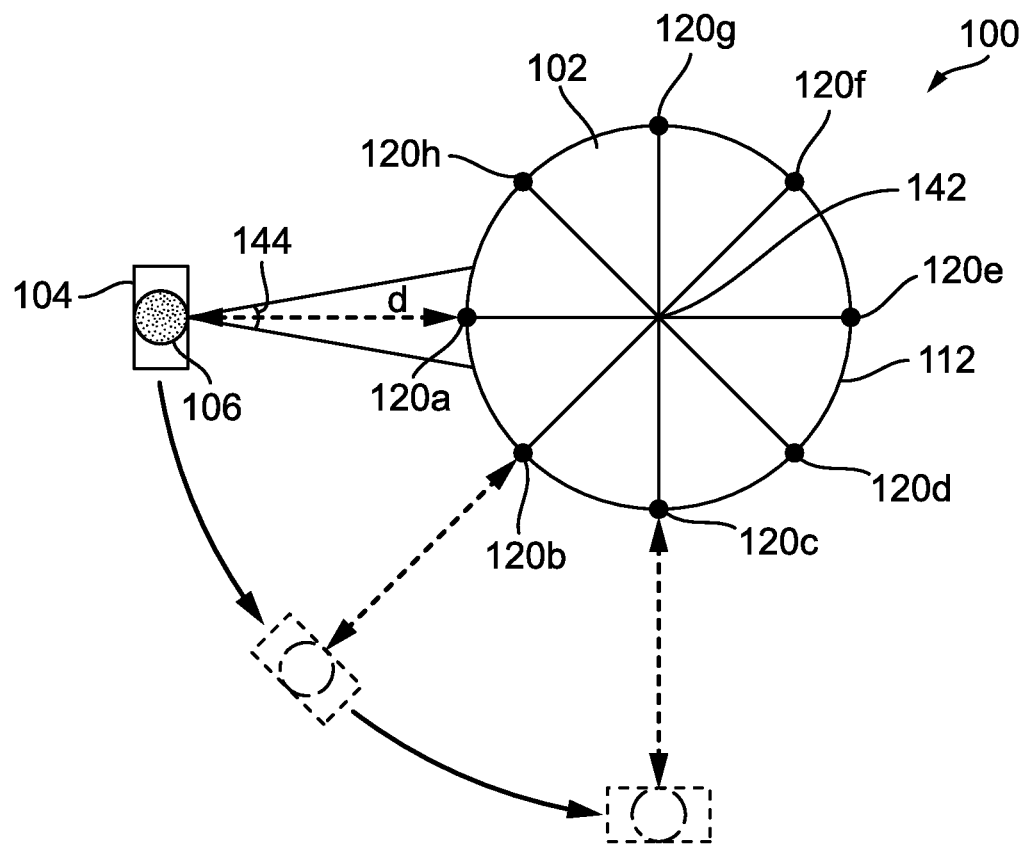
FIG. 2B is a conceptual top view representation of the exemplary LIDAR-based system for measuring the volume of a container of FIG. 2A, according to an embodiment.

FIGS. 2A and 2B are a conceptual perspective view and top view representation, respectively, of an exemplary LIDAR-based system 100 for measuring the volume of a container such as a tank 102, according to various embodiments. As shown, the system 100 includes a 3D laser range finder referred to herein as a LIDAR device 106 mounted to an autonomous vehicle such as a robotic vehicle 104, and the tank 102 is a cylindrical storage tank. The LIDAR device 106 and the robotic vehicle 104 can also be in data communication with a computing system 150 (connection means not shown) which is configured to coordinate the operation of the system 100, such as the operation of the LIDAR device 106 and the robotic vehicle 104. In various embodiments, the robotic vehicle 104 moves to different locations around the tank 102 in a direction of travel 122, as further described below.

The diagram of FIG. 2A is a perspective diagram of the exemplary system 100 showing an exemplary embodiment of the system 100 for calibrating the volume of the tank 102 by using the LIDAR device 106. The diagram of FIG. 2B shows a top view of the tank 102 circumference dotted with points indicating the location of the top of the vertical lines (120a-120h) along each of which the LIDAR device 106 scans to capture distance ranging measurements, as further described herein.

The exemplary system 100 for measuring the tank volume described herein utilizes the robotic vehicle 104 carrying the LIDAR device 106. Similar to how ORLM techniques measure the deviation of a tank wall from a reference circumference C at the base of the tank, by placing the LIDAR device 106 at certain locations around the tank 102, the LIDAR device 106 can be used to measure the outward/inward deviations of a wall 112 of the tank 102 along the vertical direction for each vertical line 120a-120h.

The LIDAR device 106 can be sequentially relocated to different circumferential measuring locations ("stations") around the tank 102 to capture the offset/distance measurements described herein at other ones of the vertical lines, e.g., 120b-h, thereby providing a more detailed set of measurements for the tank 102.

By measuring distance at different heights at multiple angular (i.e., circumferential) locations about the tank 102, circular rings can be fitted at the respective heights to estimate the full profile of the tank 102 and hence estimate the volume of the tank 102 (at times referred to herein as the "tank volume" or "tank capacity"). The present techniques advantageously allow measurement of the tank capacity while the tank 102 is in service.

FIG. 2B, which is a top view of the tank circumference, is dotted with points indicating the location of the vertical measurements the beam of the LIDAR device 106 needs to scan. Depending on the diameter of the tank 102, the number and location of the scanning lines is determined and programmed in the robotic vehicle 104.

Using the LIDAR data and navigation sensors (not shown), the robotic vehicle 104 can create the trajectory of its path and control its mobility around the tank 102. Once the robotic vehicle 104 arrives to a designated location and the LIDAR device 106 is aligned perpendicular to the wall 112 of the tank 102, the LIDAR device 106 starts measuring the horizontal distance between the LIDAR device 106 and the base reference circumference of the tank. More particularly, the LIDAR device 106 generates data indicative of a point cloud of the reference circumference sector being scanned by the laser for use in aligning the LIDAR device 106 perpendicular to the wall 112 of the tank 102. In various embodiments, when the LIDAR device 106 is aligned perpendicular to the wall 112 of the tank 102, the LIDAR device 106 starts scanning the profile of the tank 102 vertically and horizontally within a certain view angle that is predetermined. From measurements of the profile of the tank 102, horizontal offset/deviations of the wall 112 of the tank 102 with reference to the base circumference can be generated and hence the tank volume is estimated.

Preferably, in connection with scanning of a particular vertical line, say, line 120a, the LIDAR device 106 includes a 2D, vertically oriented laser scanning and ranging system. According to the techniques described herein, the LIDAR device 106 is positioned in a normal orientation relative to the tank wall tangent plane. The configuration of the LIDAR device 106 is further discussed below with respect to, for example, FIG. 3A. The horizontal distance between the 2D laser of the LIDAR device 106 and the base reference circumference of the tank 102 is measured, shown as d in FIG. 2B. The 2D laser additionally scans the distances along the vertical line 120a from the base to the roof of the tank 102 and captures measurements of the horizontal distances between the 2D laser of the LIDAR device 106 and the wall 112 of the tank 102 along the vertical line 120a. From at least these measurements, horizontal offsets of the wall 112 of the tank 102 can be calculated using principles of geometry.

Figure 3A:
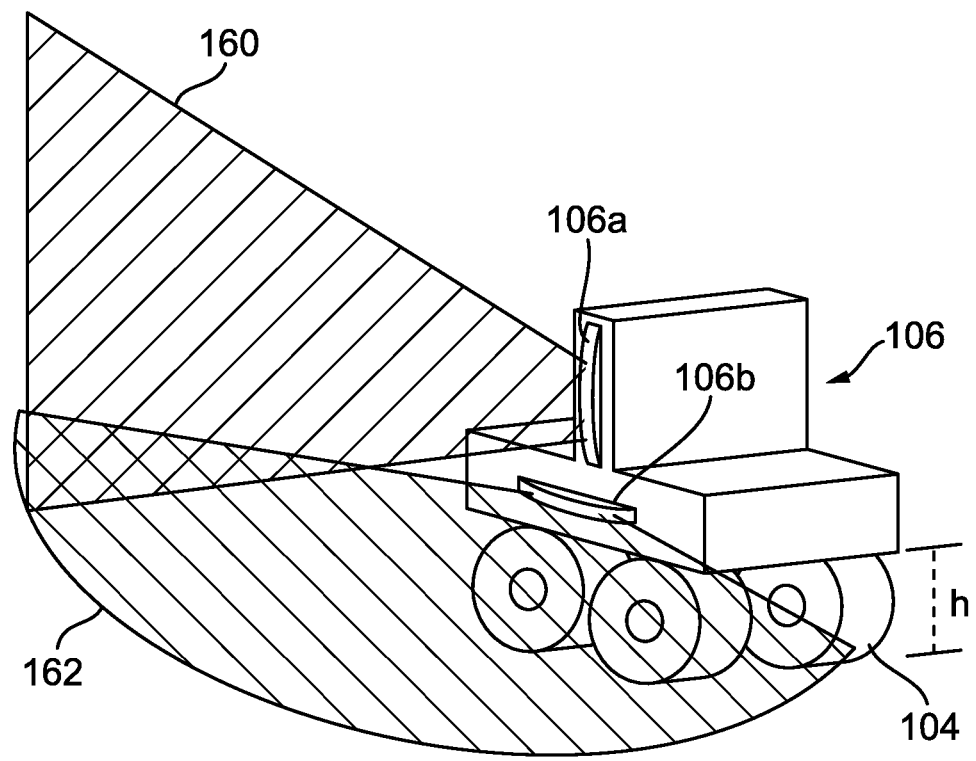
FIG. 3A illustrates further detail of a robotic vehicle equipped with a LIDAR device to scan a container, according to an embodiment.

In some embodiments, as further discussed with respect to FIG. 3A, the LIDAR device 106 includes a 3D laser and scans the distances along the vertical line 120a (and the vertical lines 120b-120h) within a predetermined angle, such as the predetermined angle 144 shown in FIG. 2B.

The previous described process can then be repeated by relocating the robotic vehicle 104 around the tank 102 to scan the tank sections at the predesignated stations, and at each station, redirecting the LIDAR device 106 (e.g., by steering of the robotic vehicle 104) so that it is in a normal orientation relative to the tank wall tangent plane that includes the corresponding line of measurement (e.g., a respective one of the lines 120a-h).

In this manner, the present techniques ensure that the LIDAR device 106 is aligned with the tangent plane of the portion of the wall 112 that includes the vertical line (e.g., the line 120a) to be scanned. The LIDAR device 106 thus scans along the vertical line (e.g., the line 120a) when the laser output from the LIDAR device 106 is moved vertically, thereby ensuring that the LIDAR device 106 is actually measuring the horizontal offsets along each of the vertical lines 120a-120h that the LIDAR device 106 is intended to measure. The operation of the LIDAR device 106 in obtaining horizontal offset measurements is thereby improved, ultimately providing more accurate information regarding hydrocarbon storage capacity of the tank 102.

Once all vertical lines are measured (e.g., 120a-h) during the scanning of all sections of the tank 102, the outer curvature of the tank 102 at effectively all heights along the vertical axes can be extrapolated and determined. By subtracting the thickness of the wall 112 of the tank 102, as determined from historical data, and accounting for the volume of any internal structures within the tank 102, the volume of the interior of the tank 102 can be calculated more accurately using the laser-based offset measurements described herein.

The number of measured vertical lines, e.g., as represented by the dots corresponding to the vertical lines 120a-h in FIG. 2B, used for performing suitable calibration of the tank 102 or other container can vary depending on application requirements. The number of measured vertical lines, for example, can be determined according to industry standards and as a function of the diameter and/or height of the tank 102. The smaller the distance between measured vertical lines, the more accurately the curvature of the tank 102 can be calculated.

As noted, the exemplary embodiments of the system 100 are configured to apply similar container calibration concepts as the known ORLM international standard. Thus, the concepts can be more easily accepted, certified and applied in the oil and gas industry. Both ORLM and the disclosed embodiments generally can rely on measuring the tank reference circumference C and measuring the horizontal offset of the tank wall from the reference ring C (e.g., deviation of the wall 112 inward and/or outward relative to the reference ring C). Moreover, in some exemplary configurations, the LIDAR device 106 can also be equipped with an infrared camera or sensor suitable for measuring the temperature of the outer surface of the wall 112 of the tank 102 while scanning the vertical lines 120a-h and thus facilitates determination of the container volume in accordance with a temperature correction factor based on the temperature measured.

In accordance with one or more aspects of the disclosed system 100, the robotic vehicle 104 is preferably an unmanned ground vehicle (UGV). As discussed above, in various embodiments, the LIDAR device 106 is mounted to the robotic vehicle 104 (e.g., the UGV). The UGV can be configured to automatically relocate the LIDAR device 106 from one point/station to another and thereby facilitate automated capture of the multiple longitudinal scans around the tank 102.

As shown in FIG. 3A, the robotic vehicle 104 can be equipped with a LIDAR device 106 as mentioned previously, to scan the tank 102 for inward/outward deviations along its height. In particular, the LIDAR device 106 can comprise a 2D vertical LIDAR scanning unit 106a which scans vertically, such as within a vertical laser plane 160. The LIDAR device 106 can also comprise a second, horizontal 2D LIDAR scanning unit 106b which scans horizontally, such as within a horizontal laser plane 162. As further described herein, horizontal LIDAR data can be utilized to aid the robotic vehicle 104 to automatically steer and adjust its orientation such that a center 142 of the tank 102 is exactly aligned with the lateral axis of the robotic vehicle 104 (labeled y-axis in FIG. 3B). This can ensure that the robotic vehicle 104 is properly aligned with the tank 102 and that the tank deviations scanned by the vertical LIDAR scanning unit 106a is representative of the condition of the tank 102 as well as to aid the UGV 104 in autonomously circumnavigating the tank 102.

In other embodiments, the LIDAR device 106 has a single 3D scanning unit (not shown as such in FIG. 3A) in place of the 2D vertical LIDAR scanning unit 106a and the 2D horizontal LIDAR scanning unit 106b. The 3D scanning unit is configured to scan horizontally to generate the horizontal LIDAR data that is utilized to aid the robotic vehicle 104 to automatically steer so that the LIDAR device 106 coupled to the robotic vehicle 104 is aligned with the tangent plane of the wall 112 at the vertical line (e.g., the vertical line 120a) being scanned, as further described herein. The 3D scanning unit is also configured to scan the vertical line 120a and the other vertical lines 120b-120h vertically within a predetermined angle (e.g., the predetermined angle 144 described with respect to FIG. 2B) to determine horizontal offsets, as further described herein.

Figure 3B:
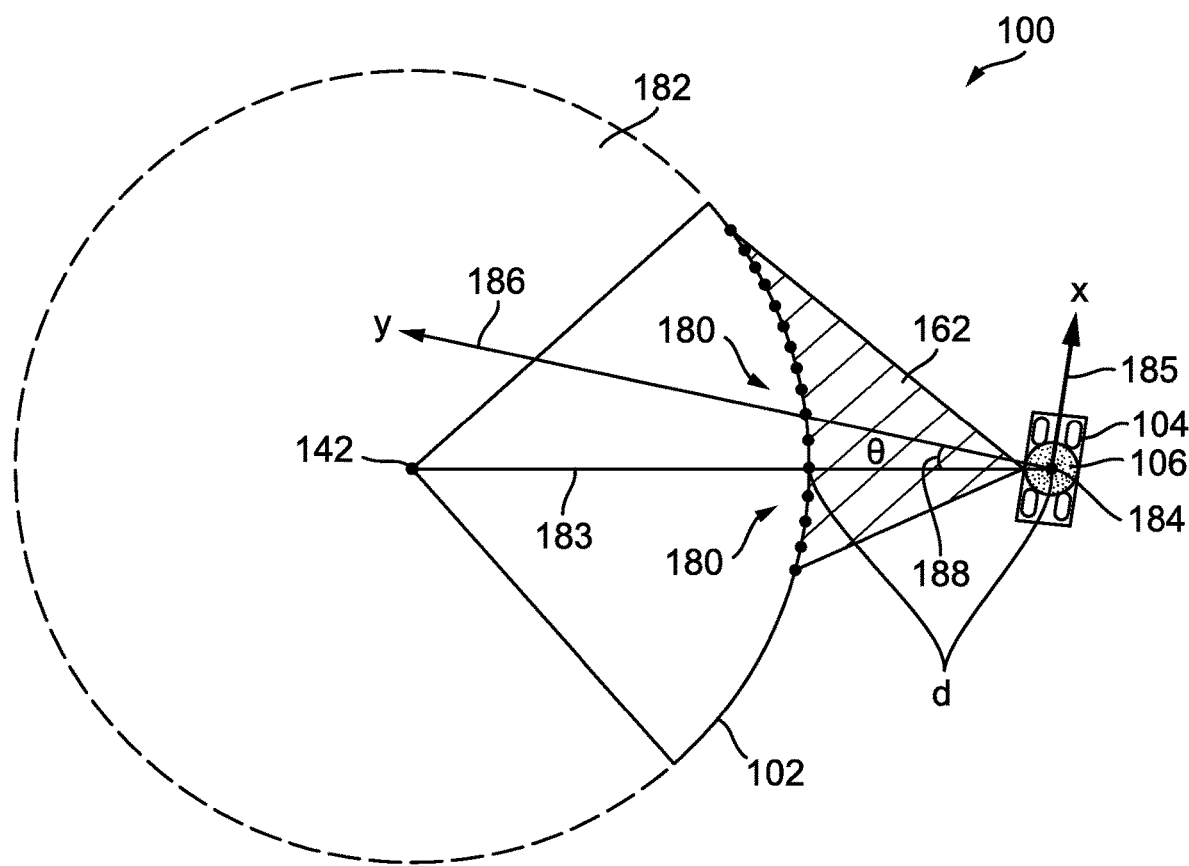
FIG. 3B is a top view of the exemplary LIDAR-based system of FIG. 2A and further illustrates alignment of a robotic vehicle and a LIDAR device relative to a center of a container and a wall of the container, according to an embodiment.

FIG. 3B is a top view of the system 100 and further illustrates the alignment of the robotic vehicle 104 and the LIDAR device 106 relative to the center 142 of the tank 102 and the wall 112 of the tank 102. In an embodiment, the horizontal LIDAR scanning unit 106b scans a sector of the reference circumference C of the tank 102, such as by scanning within a predetermined angle. The horizontal LIDAR scanning unit 106b (or a 3D LIDAR scanning unit used instead, as described elsewhere herein) obtains data indicative of locations of points along the wall 112 of the tank 102 as a result of the horizontal scanning. These points are shown as a point cloud 180 in FIG. 3B.

A best-fit circle 182 is passed through the points in the point cloud 180 to represent the tank 102. Other shapes could also be used depending on the type of asset being inspected. The dimensions of the best-fit circle 182 are used along with distance data (e.g., the known distance d, as describe elsewhere herein, or as obtained from the horizontal LIDAR scanning unit 106b) to determine coordinates $X_c$, $Y_c$ of the center 142 of the tank 102. More particularly, the coordinates $X_c$, $Y_c$ are determined as a relative displacement 183 of the center 142 of the tank 102 from a center 184 of the LIDAR device 106, along an x-axis 185 of the LIDAR device 106 and a y-axis 186 of the LIDAR device 106, respectively. An alignment angle 188 (denoted as θ) by which the robotic vehicle 104 needs to steer in order to correct its orientation so as to align an axis (e.g., the y-axis 186) of the LIDAR device 106 with a center axis (i.e., passing through the center 142 of the tank 102) is then determined as:

$$\theta = -a\tan\frac{x_c}{y_c}$$

It is worth noting that the horizontal LIDAR scanning unit 106b could be used in a manual system (i.e., a calibration system in which the laser-based scanning equipment is manually moved by human operators) to ease the process of alignment and make sure the vertical LIDAR scanning unit 106a (or a 3D LIDAR scanning unit, as described elsewhere herein) is scanning a profile that intersects with the imaginary line connecting the LIDAR device 106 with the center 142 of the tank 102.

Figure 4A:
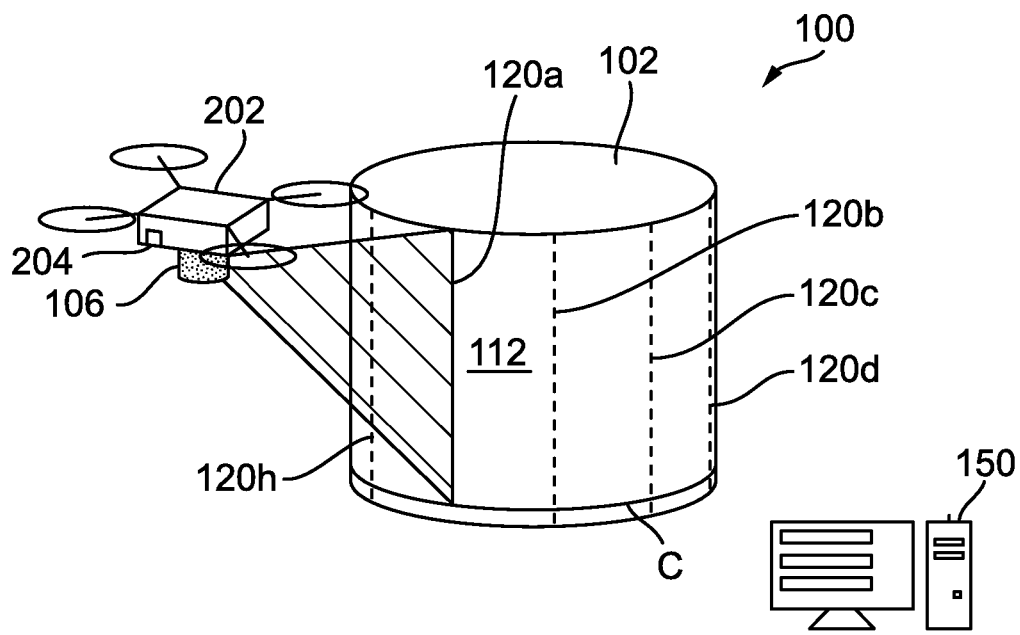
FIG. 4A is a conceptual perspective view representation of an exemplary LIDAR-based system for measuring the volume of a container in which a drone is used instead of a robotic ground vehicle, according to an embodiment.
Figure 4B:
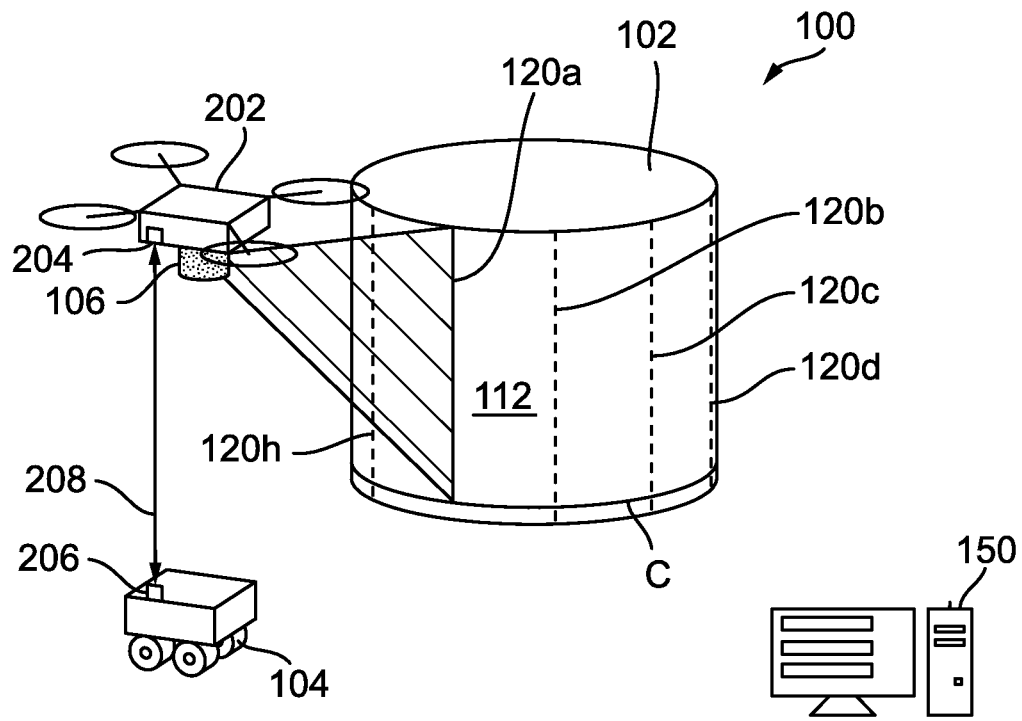
FIG. 4B is a conceptual perspective view representation of an exemplary LIDAR-based system for measuring the volume of a container in which a drone is used for measurements and in which the drone is communicatively coupled to a robotic ground vehicle, according to an embodiment.

In yet a further configuration, as shown in FIG. 4A, the autonomous vehicle is an unmanned aerial vehicle (UAV), such as a drone 202, that carries the LIDAR device 106 (e.g., with vertical and/or horizontal LIDAR scanning units such as described with respect to FIG. 3A). In this configuration, the drone 202 performs tank calibration following the same procedures highlighted above. In various embodiments, the drone 202 carries accurate navigation sensors, such as a navigation sensor 204, to stay relatively stationary in air. For more accurate measurements, the drone 202 and a UGV, such as the robotic vehicle 104, can both be used, as shown in FIG. 4B. In some such embodiments, the drone 202 and the robotic vehicle 104 are coupled with laser diodes and/or sensors to ensure that the drone is hovering above the stationary UGV and correct for any slight deviation that can introduce errors to the tank measurements described herein. In the example of FIG. 4B, the navigation sensor 204 of the drone 202 is coupled to a navigation sensor 206 of the robotic vehicle 104 via a suitable communication link 208. The drone 202 is thus maintained at a location directly above the location of the robotic vehicle 104.

As further described below in relation to FIG. 6, the computing system or device 150 can comprise one or more processors (not shown), which execute one or more software modules 688 in the form of machine implementable code and, in doing so, is configured to coordinate the measurement operations using the LIDAR device 106 and the robotic vehicle 104 connected thereto. In addition, the software modules 688 configure the system 100 to analyze the information collected using the LIDAR scanning units 106a and 106b (e.g., laser ranging data point clouds) and the robotic vehicle 104 (e.g., height and/or position of the LIDAR device 106 relative to the wall of the tank 102) and calculate various dimensions of the tank 102 or other container (i.e., the geometry of the tank 102).

Referring back to FIG. 3A, the LIDAR device 106 is mounted to the robotic vehicle 104 at a height h. To measure the volume of the tank 102, the reference circumference C of the tank 102 is preferably first measured using any appropriate method. For example, in FIG. 2A, the reference circumference is determined by measuring the horizontal distance around the circumference of the tank 102 along line C. Using the circumference measurement at the vertical reference line 120a, the ring radius of the tank 102 at the reference location can be determined using the series of equations specified in API MPMS Chapter 2.2A Appendix B to correct for the necessary adjustments to the simple geometric relationship of r=c/2π, where r is the radius, and c is the circumference of the tank 102.

As noted, the robotic vehicle 104 is preferably configured to move along the ground about the tank 102. The robotic vehicle 104 can be computer-controlled or otherwise suitably configured and/or programmed such that the robotic vehicle 104 LIDAR device 106 is automatically moved to each circumferential scanning location and, at each location, precisely aligned normal to the tangent plane of the outer surface of the wall 112 of the tank 102, such as in the manner described in detail with respect to FIG. 3B. This alignment advantageously results in the vertical LIDAR scanning unit 106a (or a 3D LIDAR scanning unit, as described elsewhere herein) being oriented along a line which extends from the central axis of the tank 102 through the particular vertical line being measured, e.g., the vertical line 120a.

In some embodiments, the LIDAR device 106 can be configured to communicate with the computing device 150 that can be configured to receive the measurements captured by the LIDAR device 106 and uses the measurements to calculate the contour of the wall 112 of the tank 102 relative to the vertical line 120a, for example, and the measured reference circumference C. Similarly, the robotic vehicle 104 can also be in data communication with the computing device 150 so as to provide additional information that might inform the calibration calculations, including without limitation, a vertical height and other positional measurements measured by sensors on-board the robotic vehicle 104, as would be understood by those of ordinary skill in the art.

Direct communication between the LIDAR device 106 and the computing device 150 is advantageous because it can greatly increase the number of measurement points used for determining the contour of the wall 112 of the tank 102, and also removes or reduces error that can be associated with human readings of an analog position indicator, such as those typically used in known laser and surveying systems. In addition, the computing device 150 can be configured to repeat the measurement automatically for measurements captured for different vertical heights on the wall 112. After measurements at the first station (e.g., corresponding to the vertical line 120a) are completed the above process can be repeated at the required number of the circumferential stations/locations around the tank 102.

Because the distance from each of the vertical lines 120a-120h to the center 142 of the tank 102 is known, as described above, the radius of the tank 102 at any given elevation can be determined based on the offset. The offset can be determined based on the measured distance of the LIDAR device 106 to the known circumference C and the measured distance from the LIDAR device 106 to the point along the vertical line being scanned at the given elevation. This in turn means that the circumference of the tank 102 at any given elevation can be determined using the formula c=2πr, where c is the circumference, and r is the radius.

The volume of the tank 102 can then be determined using the circumference calculations at any number of desired elevations along the height of the wall 112, or optimally integrated into a profile of the wall 112 at each vertical location. Each of these calculations can be carried out by the computing device 150. This allows measurement and analysis of, for example, thousands of data points along the wall 112, rather than the few measured points in known systems. This increase in measurement sensitivity, and the number of data points collected during the measurement process, leads to more accurate volume calculations during tank calibration. In addition, the techniques of the present disclosure reduce the time required to calculate the volume of the tank 102 because the data are collected and analyzed electronically in real time.

Figure 5:
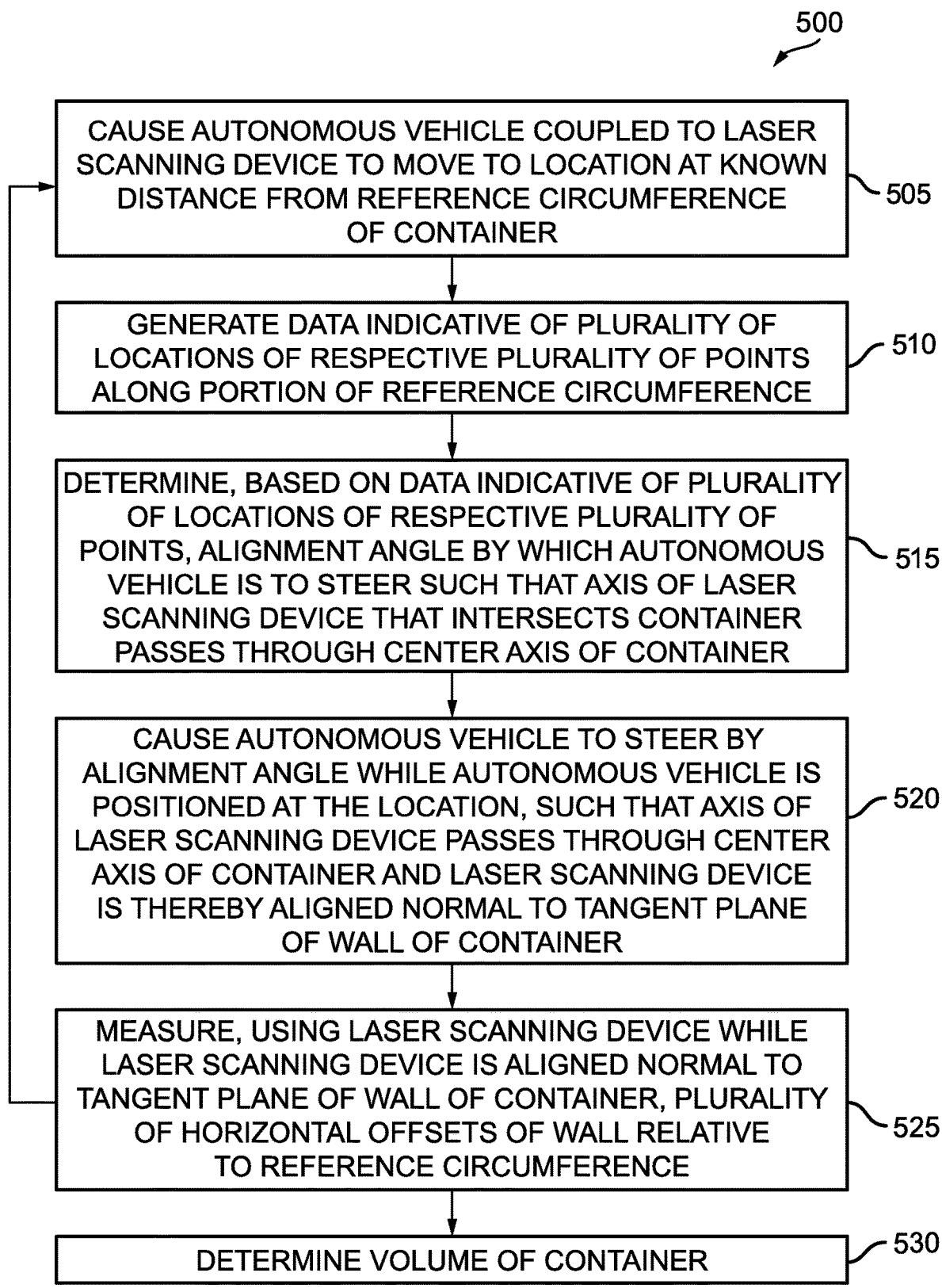
FIG. 5 is a process flow diagram illustrating an exemplary method for aligning a laser scanning device for measurement of a volume of a container, according to an embodiment.

FIG. 5 is a process flow diagram illustrating an exemplary method 500 for aligning a laser scanning device for measurement of a volume of a container, according to an embodiment. The method 500 and other methods disclosed herein can be implemented by and/or using components of the exemplary system 100 described above. Various actions described with respect to the method 500 and other methods disclosed herein can be performed using components and techniques illustrated in and described with reference to the embodiments shown in FIGS. 1, 2A, 2B, 3A, 3B, 4A, 4B, and 6.

The method 500 begins with causing 505 an autonomous vehicle coupled to a laser scanning device to move to a location at a known distance from a reference circumference of the container. In various embodiments, the robotic vehicle 104 carries the LIDAR device 106 and is programmed to and/or controlled by the computing device 150 to move to a location at the distance d from the reference circumference C of the tank 102.

The method 500 also includes generating 510 data indicative of a plurality of locations of a respective plurality of points along a portion of the reference circumference of the container. In various embodiments, the LIDAR device 106 scans a sector of the reference circumference C in a horizontal direction to generate the point cloud 180 as described above.

The method 500 also includes determining 515, based on the data indicative of the plurality of locations of the respective plurality of points, an alignment angle by which the autonomous vehicle is to steer such that an axis of the laser scanning device that intersects the container passes through a center axis of the container. In various embodiments, the alignment angle 188 is determined as described above with respect to FIG. 3B. That is, the best-fit circle 182 is determined based on the point cloud 180, and the coordinates $X_c$, $Y_c$ representing the relative displacement 183 of the center 142 of the tank 102 from the center 184 of the LIDAR device 106 are determined. The alignment angle 188 is then determined based on the coordinates $X_c$, $Y_c$ in the manner described above.

The method 500 also includes causing 520 the autonomous vehicle to steer by the alignment angle while the autonomous vehicle is positioned at the location, such that the axis of the laser scanning device passes through the center axis of the container and the laser scanning device is thereby aligned normal to a tangent plane of a wall of the container. Thus, the robotic vehicle 104 (or the drone 202) is programmed to and/or controlled by the computing device 150 to steer by the alignment angle 188 so that the y-axis 186 of the LIDAR device 106, upon steering of the robotic vehicle 104 coupled to (e.g., carrying) the LIDAR device 106, passes through a center axis of the tank 102. The LIDAR device 106, and in particular the vertical 2D LIDAR scanning unit 106a (or the 3D LIDAR scanning unit used in place thereof (not shown)), is thus aligned such that a laser output of the vertical 2D LIDAR scanning unit 106a is normal to the tangent plane of, for example, the vertical line 120a. In various embodiments, similar determination of additional alignment angles and alignment with additional tangent planes are performed when the robotic vehicle 104 or the drone 202 is subsequently positioned at additional ones of the vertical lines 120a-120h.

The method 500 additionally includes measuring 525, using the laser scanning device while the laser scanning device is aligned normal to the tangent plane of the wall of the container, a plurality of horizontal offsets of the wall relative to the reference circumference. For example, the vertical 2D LIDAR scanning unit 106a (or the 3D LIDAR scanning unit used in place thereof (not shown)) scans the vertical line 120a after the robotic vehicle 104 steers by the alignment angle 188 to align the LIDAR device 106 normal to the tangent plane of the wall 112 at the vertical line 120a. A plurality of horizontal offsets along the vertical line 120a, such as horizontal offsets at a plurality of predetermined distances along the vertical line 120a above the reference circumference C, are measured.

The method 500 further includes determining 530 a volume of the container, such as determining a volume of the tank 102. In various embodiments, the operations described with respect to steps 505, 510, 515, 520, and 525 are repeated at each location around the tank 102 corresponding to each of the vertical lines 120a-120h before the determining 530 is performed. For example, the operations described with respect to steps 505-525 are performed at a location at the distance d from the vertical line 120a, at a location at the distance d from the vertical line 120b, and so on. Once all of the horizontal offsets along all of the vertical lines 120a-120h are measured, the horizontal offsets are used in conjunction with the reference circumference C and any other suitable information to determine the volume of the tank 102.

In various embodiments, the number of vertical lines 120 is determined based on industry standards and/or dimensions of the container. For example, the number of vertical lines 120 increases as the diameter of the tank 102 increases. The vertical lines 120, and thus the corresponding locations at distance d therefrom at which operations such as those described above are performed, are evenly circumferentially spaced from one another, in various embodiments. For example, in an embodiment with eight vertical lines 120a-120h, each of the vertical lines 120a-120h is 360/8=45 degrees from each adjacent one of the vertical lines 120a-120h, as shown in FIG. 2B.

In various embodiments, the determining 530 of the one or more physical parameters of the container, such as the volume of the tank 102, is further based on (i) a thickness of the wall 112, (ii) a volume of internal structures of the tank 102 that are not usable for storage, and/or (iii) a temperature of an outer surface of the wall 112. The thickness of the wall 112 is known from historical data or input by a user of the computing device 150, in various embodiments. The volume of internal structures of the tank 102 that are not usable for storage, such as internal deadwood structures in which hydrocarbons cannot be stored, is similarly known from historical data or input by a user of the computing device 150, in various embodiments. The temperature of the outer surface of the wall 112 is, in various embodiments, determined using a temperature sensor or infrared camera of the LIDAR device 106, as described above. The temperature sensor and/or infrared camera, in various embodiments, measures the temperature of the outer surface of the wall 112, and based on the measured temperature, a temperature correction factor is applied in determining the volume of the tank 102.

Although the exemplary systems and methods for measuring container volume are described herein in the context of a particular practical application, namely, aligning a laser scanning device such as the LIDAR device 106 for measuring the volume of large petroleum storage containers having a cylindrical shape, it should be understood that the subject invention is not limited to this exemplary application. For instance, the exemplary techniques disclosed herein are similarly applicable to alignment of a laser scanning device for use in calibrating the volume of containers having other shapes, for instance, rectangular tanks; however, it can be appreciated that such alternative container shapes can require a different set of known parameters in order to calculate the container volume.

Figure 6:
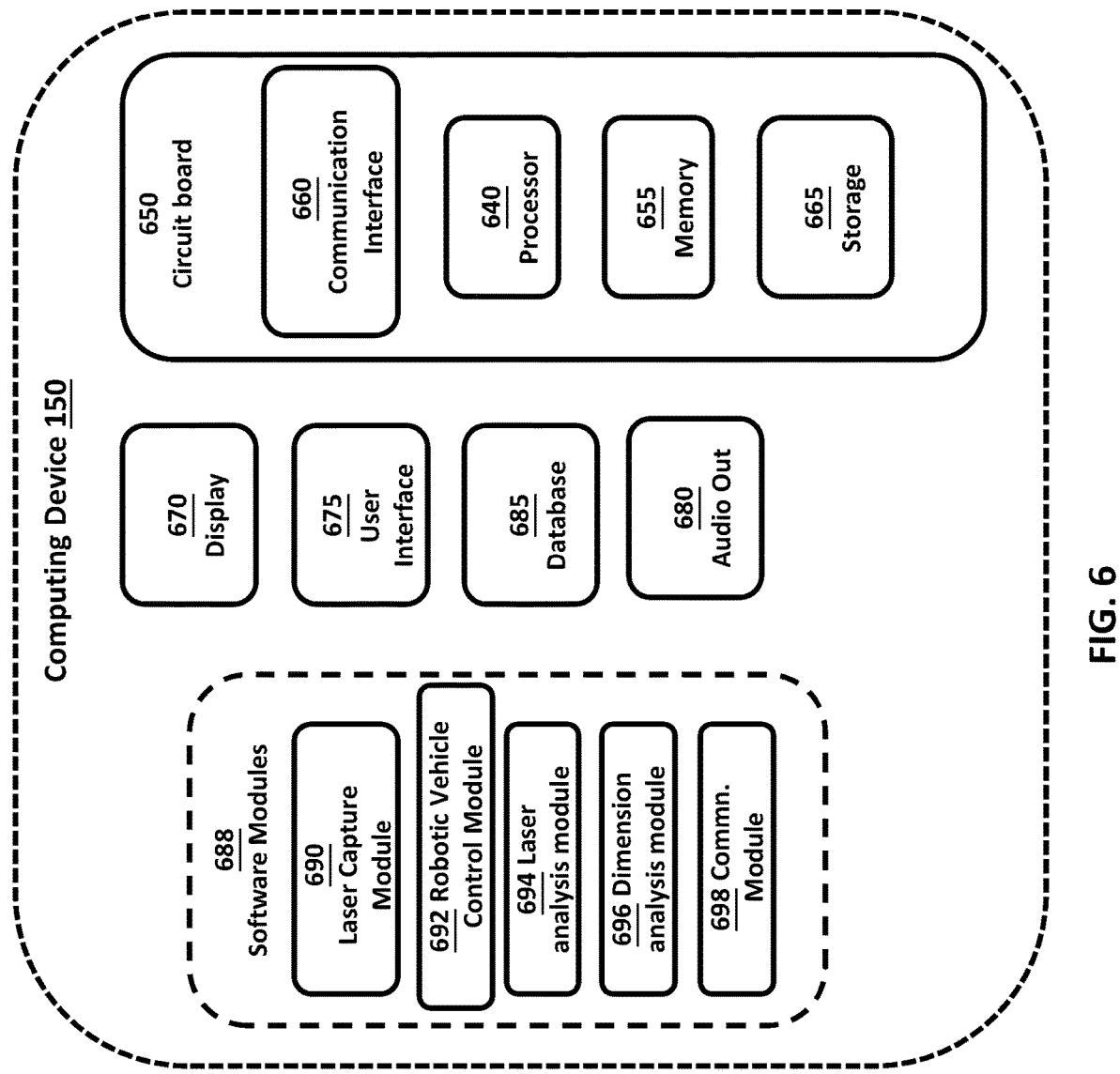
FIG. 6 is a block diagram illustrating an exemplary configuration of hardware and software components of an exemplary computing device, according to an embodiment.

FIG. 6 is a block diagram illustrating an exemplary configuration of hardware and software components of one or more of the computing devices that comprise the computing device 150 described in the present disclosure as performing the various operations relating to controlling operation of the LIDAR device 106 and/or the robotic vehicle 104 (or the drone 202) and aligning the LIDAR device 106 for measurement of horizontal offsets of a tank wall and calibrating the volume or other dimensions of a storage tank.

Components of the one or more computing devices include a processor 640 that is shown in FIG. 6 as being disposed on a circuit board 650. The circuit board can include a memory 655, a communication interface 660 and a computer readable storage medium 665 that are accessible by the processor 640. The circuit board 650 can also include or be coupled to a power source (not shown) source for powering the computing device.

The processor 640 and/or the circuit board 650 can also be coupled to a display 670, for visually outputting information to an operator (user), a user interface 675 for receiving operator inputs, and an audio output 680 for providing audio feedback as would be understood by those in the art. As an example, the processor 640 could emit a visual signal from the display 670, for instance, a computer model depicting the dimensions of a storage container being calibrated. Although the various components are depicted either independent from, or part of the circuit board 650, it can be appreciated that the components can be arranged in various configurations.

The processor 640 serves to execute software instructions that can be loaded into the memory 655. The processor 640 can be implemented using multiple processors, a multi-processor core, or some other type of processor. The memory 655 is accessible by the processor 640, thereby enabling the processor 640 to receive and execute instructions stored on the memory 655 and/or on the computer readable storage medium 665. Memory 655 can be implemented using, for example, a random access memory (RAM) or any other suitable volatile or non-volatile computer readable storage medium. In addition, memory 655 can be fixed or removable.

The computer readable storage medium 665 can also take various forms, depending on the particular implementation. For example, the computer readable storage medium 665 can contain one or more components or devices such as a hard drive, a flash memory, a rewritable optical disk, a rewritable magnetic tape, or some combination of the above. The computer readable storage medium 665 also can be fixed or removable or remote such as cloud-based data storage systems (remote memory or storage configuration not shown). The computer readable storage medium 665, for example, can be used to maintain a database 685, which stores information relating to the capture of measurement data, the dimensional calibration of respective structures and/or data used or generated while carrying out operations and implementing aspects of the systems and methods disclosed herein.

One or more software modules 688 are encoded in the memory 655 and/or the computer readable storage medium 665. The software modules 688 can comprise one or more software programs or applications having computer program code or a set of instructions executed by the processor 640. Such computer program code or instructions for carrying out operations and implementing aspects of the systems and methods disclosed herein can be written in any combination of one or more programming languages. While the software modules 688 are stored locally in computer readable storage medium 665 or memory 655 and execute locally in the processor 640, the processor 640 can interact with a remotely-based computing platform (e.g., the robotic vehicle 104 and/or the LIDAR device 106) via communication interface 660, and via a local or wide area network to perform calculations, analysis, control, and/or any other operations described herein.

During execution of the software modules 688, the processor 640 is configured to perform the various operations described herein, including without limitation, the previously described steps for aligning a laser scanning unit for measurement of a volume of a container. The software modules 688 can include code for implementing the aforementioned steps and other steps and actions described herein, for example and without limitation: a laser capture module 690, which configures the computing device 150 to operate the LIDAR device 106; a robotic vehicle control module 692, which configures the processor 640 to control the movement of the robotic vehicle 104 about the tank 102 during scanning; a laser scanning data analysis module 694, which configures the processor 640 to analyze the captured laser ranging data using geometric calculation algorithms configured to calculate the offset of the wall 112 of the tank 102 in one or more directions relative to the reference circumference; a dimension analysis module 696, which configures the processor 640 to calculate and model the geometry (e.g., volume) of a container such as the tank 102 based on the measured offsets calculated from the laser data using the computing device 150; and a communication module 698, which configures the processor 640 to communicate with remote devices (e.g., the robotic vehicle 104 and/or the LIDAR device 106) over a communication connection such as a communication network or any wired or wireless electronic communication connection.

The program code of the software modules 688 and one or more of the non-transitory computer readable storage devices (such as the memory 655 and/or the computer readable storage medium 665) can form a computer program product that can be manufactured and/or distributed in accordance with the present disclosure.

At this juncture, it should be noted that although much of the foregoing description has been directed to measuring techniques and systems and methods for alignment of a laser scanning device for calibration of the volume of storage containers, the systems and methods disclosed herein can be similarly deployed and/or implemented in scenarios, situations, and settings far beyond the referenced scenarios.

It should be appreciated that more or fewer operations can be performed than shown in the figures and described. These operations can also be performed in a different order than those described. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a system and a method (which in various embodiments is at least partially computer-implemented), computer system, and computer program product for aligning a laser scanning device for calibration of the volume of storage containers. The flowchart and diagrams in the figures illustrate the architecture, functionality, and operation of possible implementations of systems, methods and computer program products according to various embodiments and arrangements. In this regard, each block in the flowchart or other diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the diagrams and/or flowchart illustration, and combinations of blocks in the diagrams and/or flowchart illustration, can be implemented by and/or using special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present disclosure, which is set forth in the following claims.

What is claimed is:

1. A method for aligning a laser scanning device for measurement of a volume of a container, the method comprising:
   causing an autonomous vehicle coupled to the laser scanning device to move to a location at a known distance from a reference circumference of the container;
   generating, using the laser scanning device, data indicative of a plurality of locations of a respective plurality of points along a portion of the reference circumference of the container;
   determining, based on the data indicative of the plurality of locations of the respective plurality of points, an alignment angle by which the autonomous vehicle is to steer such that an axis of the laser scanning device that intersects the container passes through a center axis of the container;
   causing the autonomous vehicle to steer by the alignment angle while the autonomous vehicle is positioned at the location, such that the axis of the laser scanning device passes through the center axis of the container and the laser scanning device is thereby aligned normal to a tangent plane of a wall of the container; and
   measuring, using the laser scanning device while the laser scanning device is aligned normal to the tangent plane of the wall, a plurality of horizontal offsets of the wall relative to the reference circumference for use in determining the volume of the container.

2. The method of claim 1, wherein the location is a first location, wherein the alignment angle is a first alignment angle, wherein the tangent plane is a first tangent plane, and wherein the plurality of horizontal offsets is a first plurality of horizontal offsets, the method further comprising:
   causing the autonomous vehicle to move to a plurality of additional locations, the first location and the plurality of additional locations evenly circumferentially spaced from one another, each of the plurality of additional locations being at the known distance from the reference circumference of the container;
   causing, at each respective one of the plurality of additional locations, the autonomous vehicle to steer by a respective additional alignment angle such that the axis of the laser scanning device passes through the center axis of the container and the laser scanning device is thereby aligned normal to a respective additional tangent plane of the wall;
   measuring, at each respective one of the plurality of additional locations, using the laser scanning device while the laser scanning device is aligned normal to the respective additional tangent plane of the wall, a respective additional plurality of horizontal offsets of the wall relative to the reference circumference of the container; and
   determining the volume of the container based on a measurement of the reference circumference, the first plurality of horizontal offsets, and each respective additional plurality of horizontal offsets.

3. The method of claim 2, further comprising:
   determining, based on one or more dimensions of the container, a number of additional locations to be contained in the plurality of additional locations;
   determining, based on the determined number of additional locations, an angle by which the first location and the plurality of additional locations are to be evenly circumferentially spaced from one another; and
   determining the first location and the plurality of additional locations based on the determined number of additional locations and the determined angle.

4. The method of claim 2, further comprising:
   determining a thickness of the wall of the container; and
   determining a volume of structures within the container that are not usable for storage,
   wherein determining the volume of the container is further based on the thickness of the wall and the volume of the structures within the container that are not usable for storage.

5. The method of claim 4, further comprising measuring, using a temperature sensor or infrared camera, a temperature of an outer surface of the wall of the container, wherein determining the volume of the container is further based on the measured temperature.

6. The method of claim 1, wherein measuring the plurality of horizontal offsets comprises scanning the wall of the container vertically using a two-dimensional laser of the laser scanning device while the laser scanning device is aligned normal to the tangent plane of the wall.

7. The method of claim 1, wherein measuring the plurality of horizontal offsets comprises scanning the wall of the container vertically and horizontally within a predetermined angle using a three-dimensional laser of the laser scanning device while the laser scanning device is aligned normal to the tangent plane of the wall.

8. A system for aligning a laser scanning device for measurement of a volume of a container, the system comprising:
   the laser scanning device, the laser scanning device having an axis that intersects the container, the laser scanning device configured to scan a portion of a reference circumference of the container to generate data indicative of a plurality of locations of a respective plurality of points along the portion of the reference circumference; and
   an autonomous vehicle coupled to the laser scanning device, the autonomous vehicle configured to:
      move to a location at a known distance from the reference circumference to thereby allow the laser scanning device to scan the portion of the reference circumference; and
      steer by an alignment angle while being positioned at the location, the alignment angle being determined based on the data indicative of the plurality of locations of the respective plurality of points such that upon steering by the alignment angle, the axis of the laser scanning device passes through a center axis of the container to thereby align the laser scanning device normal to a tangent plane of a wall of the container,
   wherein the laser scanning device is further configured to scan the wall of the container, while the laser scanning device is aligned normal to the tangent plane of the wall, to measure a plurality of horizontal offsets of the wall relative to the reference circumference for use in determining the volume of the container.

9. The system of claim 8, wherein the location is a first location, wherein the alignment angle is a first alignment angle, wherein the tangent plane is a first tangent plane, wherein the plurality of horizontal offsets is a first plurality of horizontal offsets, wherein the autonomous vehicle is further configured to:
   move to a plurality of additional locations, the first location and the plurality of additional locations evenly circumferentially spaced from one another, each of the plurality of additional locations being at the known distance from the reference circumference of the container; and
   steer, at each respective one of the plurality of additional locations, by a respective additional alignment angle such that the axis of the laser scanning device passes through the center axis of the container and the laser scanning device is thereby aligned normal to a respective additional tangent plane of the wall,
   wherein the laser scanning device is further configured to scan, at each respective one of the plurality of additional locations while the laser scanning device is aligned normal to the respective additional tangent plane of the wall, a respective additional plurality of horizontal offsets of the wall relative to the reference circumference for use in determining the volume of the container.

10. The system of claim 9, further comprising a computing device communicatively coupled to at least one of the autonomous vehicle and the laser scanning device, wherein the computing device is configured to determine the volume of the container based on a measurement of the reference circumference, the first plurality of horizontal offsets, and each respective additional plurality of horizontal offsets.

11. The system of claim 10, wherein the computing device is configured to determine the volume of the container further based on a thickness of the wall of the container and a volume of structures within the container that are not usable for storage.

12. The system of claim 11, wherein the laser scanning device includes a temperature sensor or an infrared camera, the temperature sensor or the infrared camera configured to measure a temperature of an outer surface of the wall of the container, and wherein the computing device is configured to determine the volume of the container further based on the measured temperature.

13. The system of claim 8, wherein the autonomous vehicle is an unmanned ground vehicle (UGV) or an unmanned aerial vehicle (UAV).

14. The system of claim 13, wherein the location is a first location, wherein the autonomous vehicle is the UAV, and wherein the UAV is coupled, using at least one of a sensor and a laser diode, to an unmanned ground vehicle (UGV) positioned at a second location directly below the first location to thereby maintain the UAV at the first location.

15. The system of claim 8, wherein the laser scanning device comprises a LIDAR device.

16. The system of claim 15, wherein the LIDAR device comprises:
   a horizontal two-dimensional (2D) LIDAR scanning unit configured to scan the portion of the reference circumference to generate the data indicative of the plurality of locations of the respective plurality of points; and
   a vertical 2D LIDAR scanning unit configured to scan the wall of the container, while the LIDAR device is aligned normal to the tangent plane of the wall, to measure the plurality of horizontal offsets of the wall.

17. The system of claim 15, wherein the LIDAR device comprises a three-dimensional (3D) LIDAR scanning unit configured to:
   scan the portion of the reference circumference to generate the data indicative of the plurality of locations of the respective plurality of points; and
   scan the wall of the container within a predetermined angle, while the LIDAR device is aligned normal to the tangent plane of the wall, to measure the plurality of horizontal offsets of the wall.

18. A method for aligning a laser scanning device for measurement of a volume of a container, the method comprising:
   determining a plurality of locations that are evenly spaced circumferentially around the container;
   causing an autonomous vehicle coupled to the laser scanning device to move sequentially to each of the plurality of locations;
   scanning, using the laser scanning device at each respective one of the plurality of locations to which the autonomous vehicle moves, a respective portion of a reference circumference of the container to thereby identify a respective plurality of points on a wall of the container;
   determining, for each respective one of the plurality of locations to which the autonomous vehicle moves, based on the respective plurality of points on the wall of the container, an alignment angle by which the autonomous vehicle is to steer such that the laser scanning device is aligned normal to a tangent plane of the wall; and scanning, using the laser scanning device for each respective one of the plurality of locations to which the autonomous vehicle moves, while the laser scanning device is aligned normal to the tangent plane of the wall, a respective portion of the wall to determine a respective plurality of horizontal offsets of the wall relative to the reference circumference for use in determining the volume of the container.

19. The method of claim 18, further comprising determining the volume of the container based on a measurement of the reference circumference and based on each respective plurality of horizontal offsets of the wall.

20. The method of claim 19, further comprising:

determining a thickness of the wall of the container; and determining a volume of structures within the container that are not usable for storage, wherein determining the volume of the container is further based on the thickness of the wall and the volume of the structures within the container that are not usable for storage.

* * * * *